(12) United States Patent
Larsen

(10) Patent No.: US 12,297,627 B2
(45) Date of Patent: May 13, 2025

(54) POWER AND COMMUNICATIONS PEDESTAL FOR RECREATIONAL VEHICLES

(71) Applicant: Motion Power LLC, Stuart, FL (US)

(72) Inventor: Eric Larsen, Port Saint Lucie, FL (US)

(*) Notice: Subject to any disclaimer, the term of this patent is extended or adjusted under 35 U.S.C. 154(b) by 0 days.

(21) Appl. No.: 17/857,796

(22) Filed: Jul. 5, 2022

(65) Prior Publication Data

US 2023/0011288 A1 Jan. 12, 2023

Related U.S. Application Data

(60) Provisional application No. 63/218,888, filed on Jul. 6, 2021.

(51) Int. Cl.
| | | |
|---|---|---|
| *E03B 7/00* | (2006.01) | |
| *E03B 7/04* | (2006.01) | |
| *G06Q 50/06* | (2012.01) | |
| *H01R 33/92* | (2006.01) | |
| *B60L 53/18* | (2019.01) | |
| *B60L 53/66* | (2019.01) | |
| *H02G 3/04* | (2006.01) | |

(52) U.S. Cl.
CPC ............... *E03B 7/04* (2013.01); *G06Q 50/06* (2013.01); *H01R 33/92* (2013.01); *B60L 53/18* (2019.02); *B60L 53/665* (2019.02); *H01R 2201/26* (2013.01); *H02G 3/0456* (2013.01)

(58) Field of Classification Search
CPC .......... E03B 7/04; B60L 53/665; B60L 53/18
See application file for complete search history.

(56) References Cited

U.S. PATENT DOCUMENTS

2003/0099548 A1* 5/2003 Meza ................... F04B 43/0054
417/44.1

* cited by examiner

*Primary Examiner* — Phuong Chi Thi Nguyen

(57) ABSTRACT

The present disclosure generally relates to a recreational vehicle (RV) pedestal, system, network, and mobile software application. Pedestals may integrate power sources of different power levels for different vehicle load requirements. Pedestals may combine power, electronics, communications connections, and water sources in the same device. The pedestals may be networked so that users may access a mobile application to reserve, pay for, and review pedestals and the RV park.

15 Claims, 14 Drawing Sheets

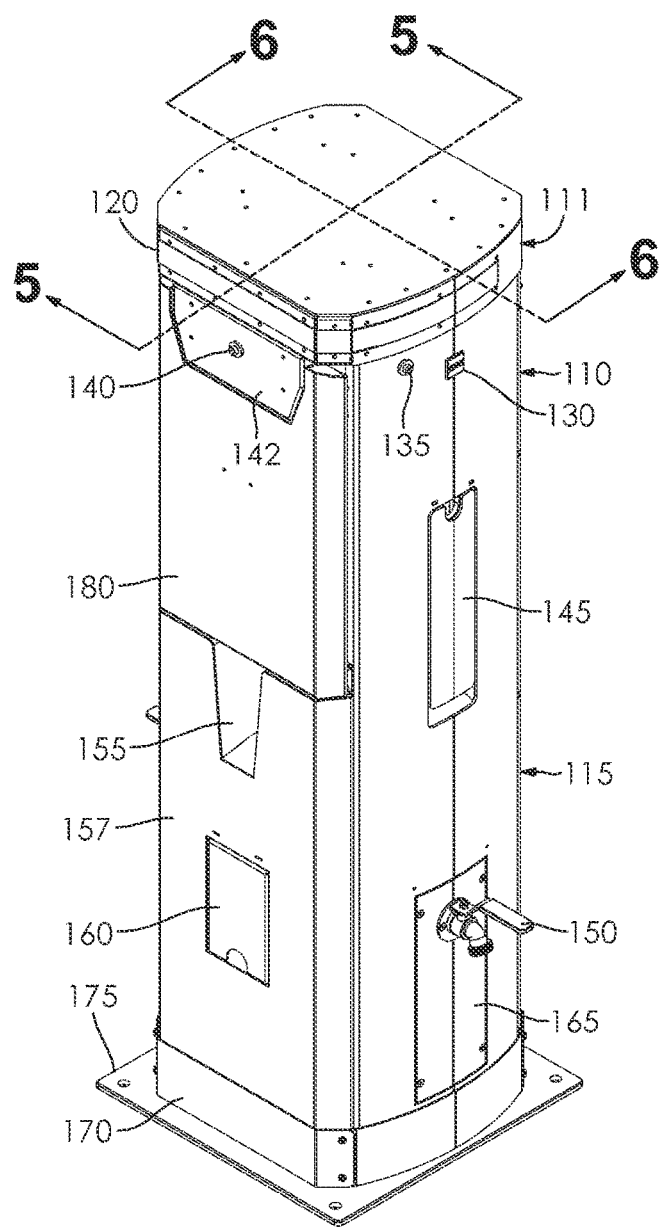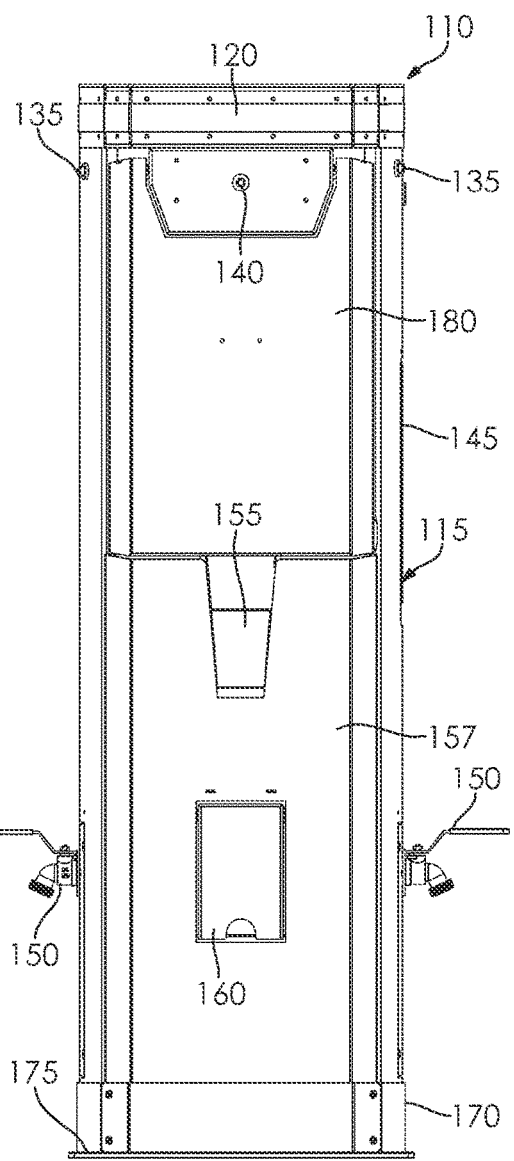
FIG. 1
FIG. 2

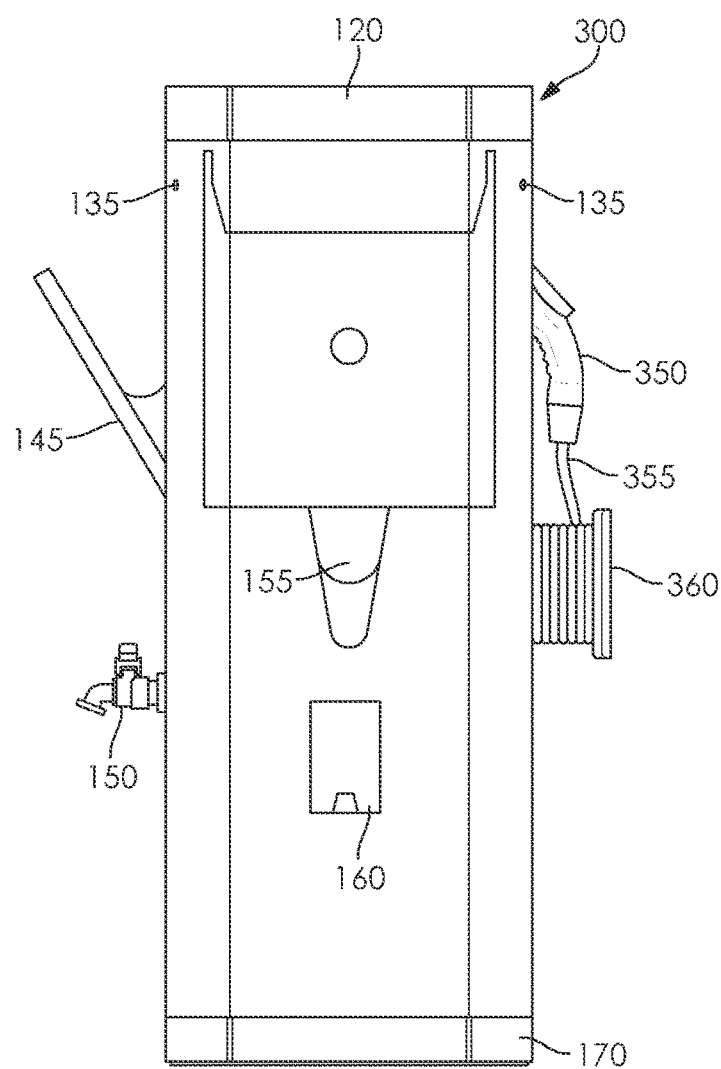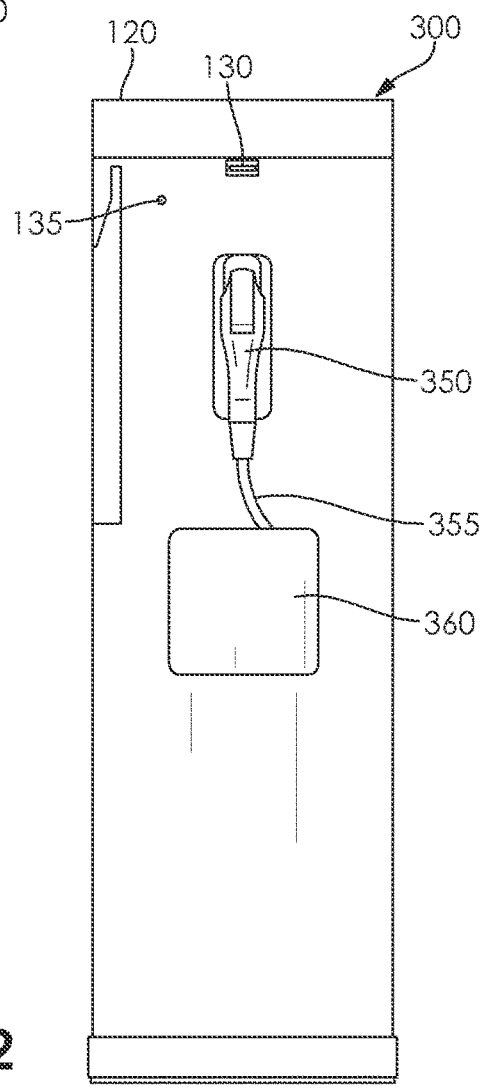
FIG. 11
FIG. 12

POWER AND COMMUNICATIONS PEDESTAL FOR RECREATIONAL VEHICLES

CROSS-REFERENCE TO RELATED APPLICATIONS

This application claims benefit under 35 U.S.C. § 119(e) of U.S. Provisional Application having Ser. No. 63/218,888 filed Jul. 6, 2021, which is hereby incorporated by reference herein in its entirety.

TECHNICAL FIELD

The present disclosure is directed to recreational vehicle pedestals.

BACKGROUND OF THE DISCLOSURE

Conventional recreational vehicle (RV) parks include separate facilities for users' needs. An RV site may include a water faucet connected to standard plumbing lines. Some sites may include an electrical outlet to plug into, which may be connected to a 120/240V line. Usually, features such as the water or power line are distinct from one another.

The conventional RV experience can be logistically daunting. Recreational vehicles are much larger than common cars and require a lot of resources and planning. RVs are prohibited from being parked in many places. In some locales, an RV owner must find an RV park or campground to park an RV. As is known to RV owners, RVs carry their own source of water for use in drinking, showering, flushing, etc. Accordingly, an RV commonly needs to find some space with a water tap and/or waste disposal facility. Since RVs carry a number of appliances for cooking, refrigeration, and entertainment, the modern RV experience begs is filled with additional power demands that conventional RV sites lack. To use an RV space, the user typically arrives on site and checks with a manager for space availability. The manager assigns an open space to the user and the user finds the space on their own, navigating by eye and intuition into the space. If the park is full, the RV user will not know until arrival. Any connections to the RV are manual and passive.

SUMMARY

In one aspect of the disclosure, a pedestal device for providing one or more connections to a recreational vehicle (RV) is disclosed. The pedestal device includes a supporting frame. A control module is coupled to the frame. The control module includes a computer processor. In addition, the pedestal device includes a power source. One or more electrical outlets are coupled to the power source. A network connection coupled to the control module. The network connection is configured for wired and/or wireless connectivity.

In another aspect, a computer program product for connecting recreational vehicles (RV) to RV parking sites is disclosed. The computer program product comprises a non-transitory computer readable storage medium having computer readable program code embodied therewith. The computer readable program code is configured, when executed by a processor, to: connect a network of RV pedestals to a centralized computer server or cloud based computer server; receive from an end user, an inquiry for available RV pedestals at one or more RV parking sites; determine an availability of one or more RV pedestals in the network; display through a user interface on a mobile computing device, the availability of one or more RV pedestals in the network; detect an occupancy of an RV space associated with one of the one or more RV pedestals in the network; and remove the RV pedestal with a detected occupancy of the RV space from availability in the connected network.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

FIG. 1 is a right hand, top, perspective of a recreational vehicle (RV) pedestal in accordance with an illustrative embodiment of the present disclosure;

FIG. 2 is a front view of the RV pedestal of FIG. 1;

FIG. 11 is a front view of an RV pedestal in accordance with another embodiment of the present disclosure;

FIG. 12 is a right hand side view of the pedestal of FIG. 11;

DETAILED DESCRIPTION AND INDUSTRIAL APPLICABILITY

Figure 3:
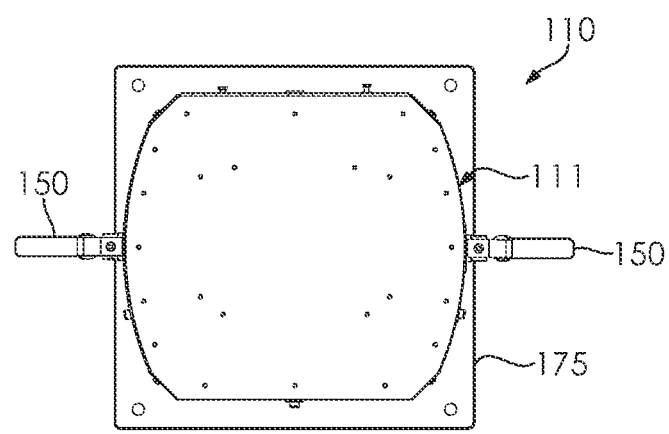
FIG. 3 is a top view of the RV pedestal of FIG. 1.
Figure 4:
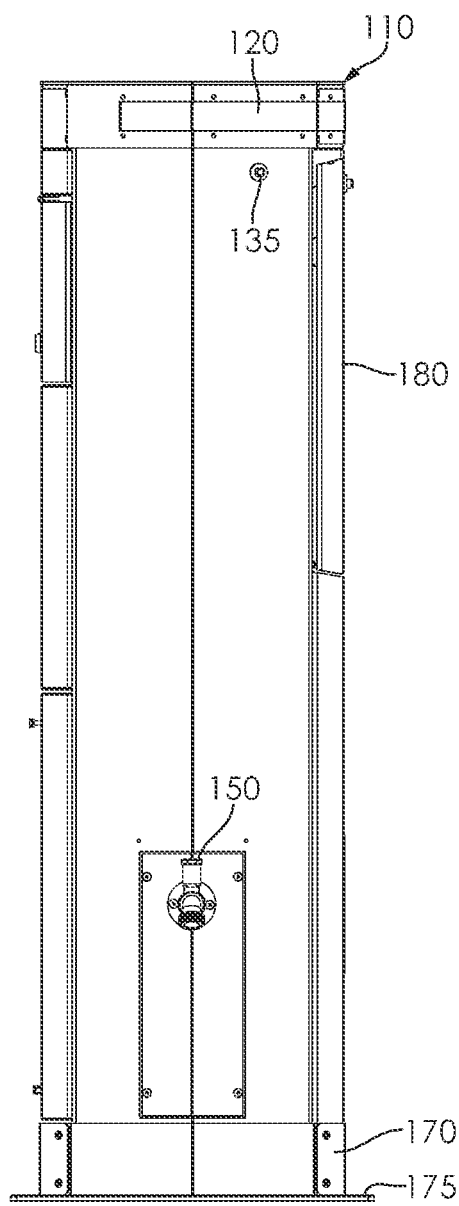
FIG. 4 is a left side view of the RV pedestal of FIG. 1.

In general, and referring now to FIGS. 1-11, a recreational vehicle (RV) pedestal device 110 is shown according to an illustrative embodiment system for an improved RV experience. Throughout the disclosure, the pedestal device 110 may sometimes be referred to interchangeably as the "device 110" or the "pedestal 110". Generally speaking, the pedestal 110 includes a variety of functional elements integrated into a single package providing advanced conveniences for an end user RV owner. In one illustrative aspect of the pedestal 110, it will be appreciated that network connectivity is provided that offers features to RV pedestals that are not generally associated with the RV site experience. The network connectivity in combination with other elements of the device 110 provide for example, power, water, and connection to the Internet that heretofore required separate devices. Moreover, the integrated connectivity provides end users with information that usually required manual investigation. As will be seen below, network of RV pedestals is provided in one embodiment. End users may now be provided with advanced information about RV sites and availability. In addition, a convenient system becomes available that allows end users to reserve RV pedestal spaces, reserve/pay for usage of a device 110 online, and plan/locate pedestals 110 along trips. Under another illustrative aspect, an RV can receive power from the pedestal 110 and an electric tow vehicle such as an all electric or hybrid pickup truck can be charged at the same time as any device or battery of the RV.

In an illustrative embodiment, a pedestal 110 may generally include a frame or housing 111. Embodiments may include a plurality of panels that cover different elements of the pedestal 110 so that the pedestal 110 may generally enclose the features within a protective shell 115. Some panels on the shell 115 may include for example, a bottom front panel 157, a panel 160 that protects and provides access to a coaxial port 275 and Ethernet port 280 (discussed below) and top front panel cover 180 that protects and provides access to power receptacles 215, 225, and 230 (discussed below). The panel 160 may be hinged or removable. The cover 180 may be hinged on its top edge to flip upward exposing the outlets underneath. Some embodiments include a channel 155 on the top edge of the panel 157 to allow for a cord to access the underlying power receptacle beneath the cover 180 when the cover is closed. Some embodiments of the pedestal 110 may include a light 120 and an ambient light sensor 140. In the illustrative embodiment shown, the light 120 may wrap around a top edge of the shell 115. In one embodiment, the light 120 encircles approximately 220 degrees around the top edge. The light 120 may be inside a light bay 125 that is covered by a lens. In some embodiments, the light bay 125 may be modular. The controller module 185 may be installed into the light bay 125 so that features such as lighting and network connectivity may be retrofit onto pre-existing pedestals. The light sensor 140 may be positioned on a panel 142 adjacent the light 120 and above the panel cover 180. In some embodiments, the panel cover 180 may be cut along its top edge indexed with the outline of the panel 142 so that when the panel cover 180 is lifted, the panel cover 180 is not obstructed by the panel 142. See for example, FIG. 7.

Some embodiments of the pedestal 110 include a winged cord/hose management hanger 145 (referred to generally as the "hanger 145"). The hanger 145 may be configured to slide or pop in and out of the shell 115. Compare for example, FIG. 1 (closed state) to FIGS. 7-9 (open state). The winged cord/hose management hanger 145 may be on a friction hinge for the user to pull outward from the top to open, and reverses the process to close the hanger 145 back into the housing shell 115. In the open state, the hanger 145 may provide a temporary mount for cables or hoses that are plugged into the pedestal 110 to keep the cables and hoses off the ground.

Three examples of mounting options include: using an internal post onto which the shell 115 (and attached components) are mounted, a base plate (for example, base 175) for mounting to hard surfaces such as a cement slab, and a buried in-ground metal structure that the pedestal is attached to. Some embodiments of the pedestal 110 may include a stainless steel skirt 170 protecting the bottom edge/painted surface of the shell 115 from for example, equipment such as line trimmers (also known as weed whackers) since these are often installed where there is surrounding grass and the lines can scrape the shell's surface.

Figure 5:
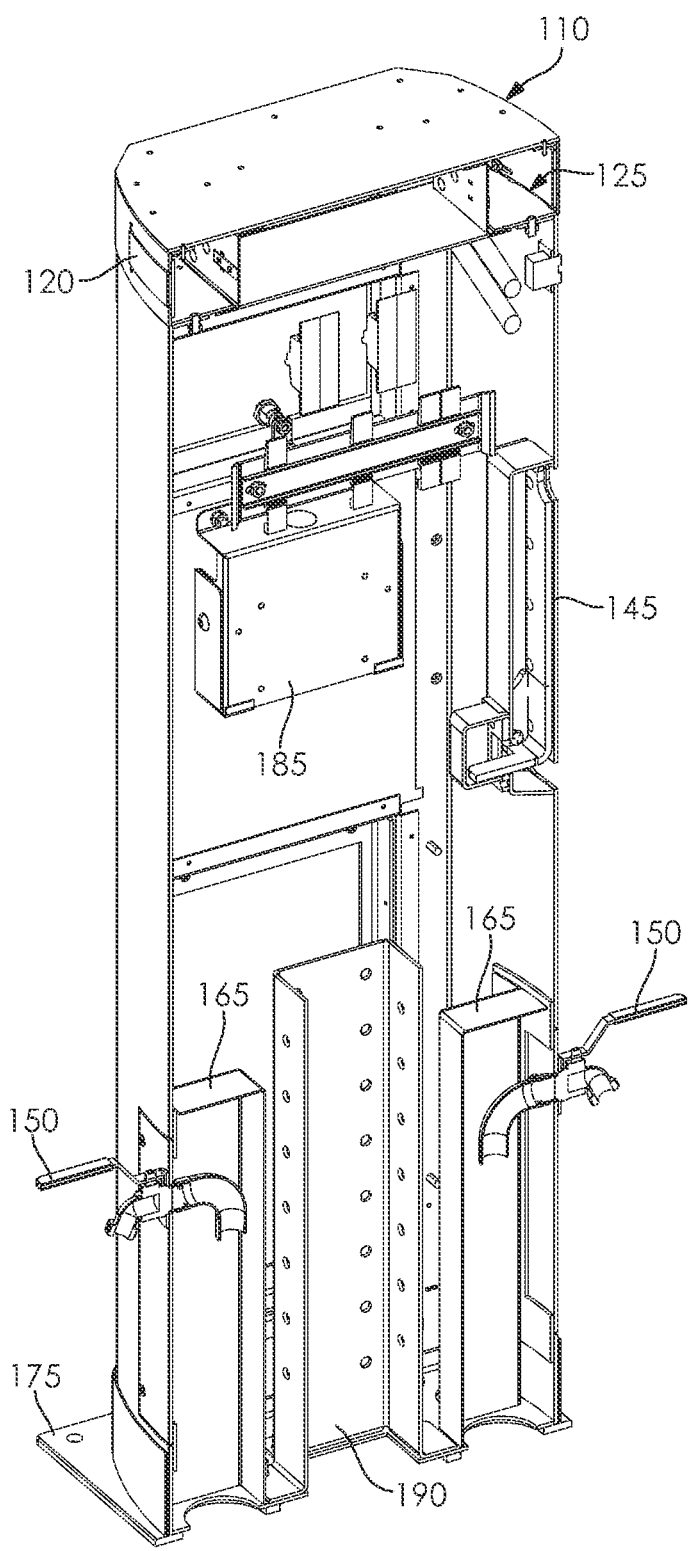
FIG. 5 is a cross-sectional view taken along the line 5-5 of FIG. 1 consistent with an embodiment of the present disclosure.
Figure 13:
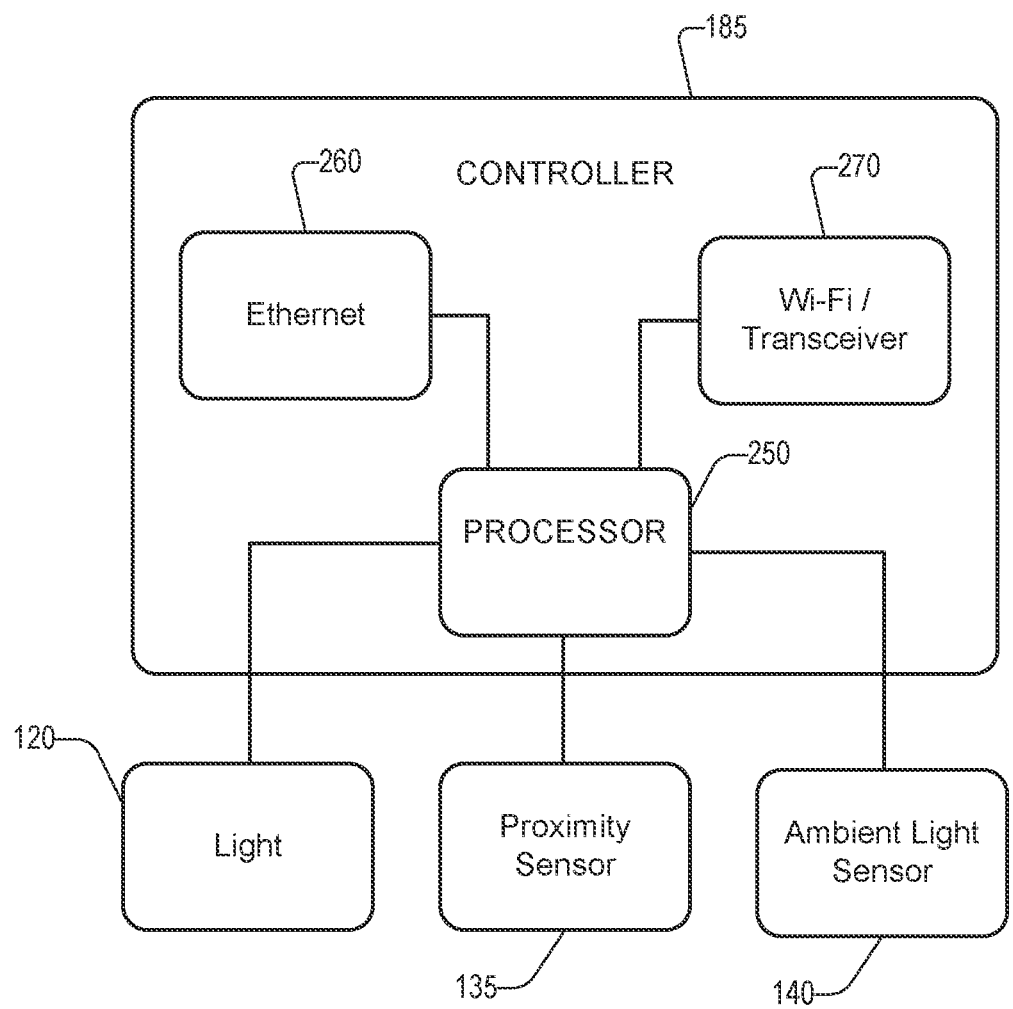
FIG. 13 is a block diagram of a connection scheme for electronic elements in accordance with at least some embodiments of the present disclosure.

Referring temporarily and specifically to FIGS. 5 and 13, the pedestal 110 includes a controller module 185 mounted to the frame 111. The controller module 185 may house electronics that are not visible in the drawings. For example, the controller module 185 includes a computer processor 250 for coordinating data provided by other electronic elements in the device 110 and network connections (for example, an Ethernet controller 260 for hardwired applications and/or a Wi-Fi/Transceiver module 270 to provide wireless connections to external entities). The computer processor 250, Ethernet controller 260, and Wi-Fi/Transceiver module 270 may be integrated into a printed circuit board or other circuit module. Other electronic elements that may be a part of the pedestal 110 and connected to the computer processor 250 that can be seen in other figures as well include the light 120, the proximity sensor 135, and the ambient light sensor 140. As will be appreciated, the Ethernet controller 260 and Wi-Fi/Transceiver 270 provide connectivity to devices that are external to the pedestal 110. In their combination with the computer processor 250, the Ethernet controller 260 and Wi-Fi/Transceiver 270 provide information about the current state of usage of the pedestal 110 that can be used for a variety of features, some of which are described as illustrative examples below.

The controller module 185 may incorporate the logic for features including for example, motion detection, remote utility (water and power) readings, assistance alerts, etc. Some pedestal embodiments may include proximity detection sensors 135. See for example, FIGS. 1-4. The proximity detection sensors 135 may detect when an object falls within range. A visual alert (for example, the light 120) or an audible alert may be triggered. As may be appreciated, drivers backing into an RV site may not see the pedestal 110 so the alert helps prevent the driver from backing into a pedestal 110 by accident.

In some embodiments, the pedestal 110 may include a power meter 130 for sub-metering power. In many jurisdictions, a park owner cannot charge for actual usage, but may charge a flat fee. The power meter 130 monitors usage (and may include a visual display of power usage level(s)) so that the park management can determine if they are charging enough for electricity to cover costs or if there is excessive use by one or more park guests.

As can also be seen in FIG. 5, some embodiments may include a rail post 190 that may be configured to receive the frame 111. The rail post 190 may be mounted into a pedestal site adjacent an RV space (not shown). In one exemplary manner of securing the pedestal 110 into place, the frame 111 may be slid onto the rail post 190 so that power (cables, etc.) and water connections (pipes, etc.) in the ground align with appropriate power and water connections in the pedestal 110. Since terrain is often uneven where post mounting occurs, an installer can slide the unit up or down to easily adjust for variations in the surrounding area. Some embodiments may include a spring-loaded locking mechanism which secures the pedestal 110 into place and should an adjustment be needed, an access panel allows a service technician to open the opposing locking mechanisms and raise or lower the unit.

For sake of illustration, cables, piping, and other conduits are omitted from the drawings. As can also be seen, some embodiments may include one or more water spigots 150 integrated into the frame 111 simultaneously with power and signal sources. Some embodiments may include a baffle 165 that encloses the water lines/spigots 150 and shields the electrical components from the water sources. In some embodiments, the baffle 165 may surround the water line to the water spigot 150 from all sides (which can be seen when viewing FIG. 5 in combination with FIG. 1). Should a water leak occur, the water is dispersed out of the bottom of the shell 115 without infiltrating the electrical connections.

Figure 8:
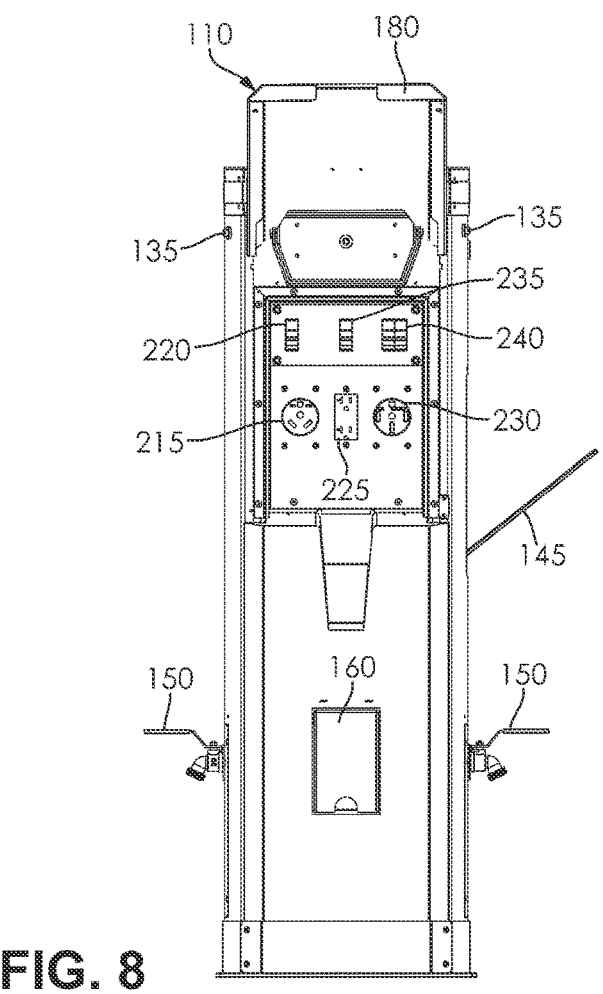
FIG. 8 is a front view of the RV pedestal of FIG. 1 with a front facing panel open consistent with an embodiment of the present disclosure.
Figure 9:
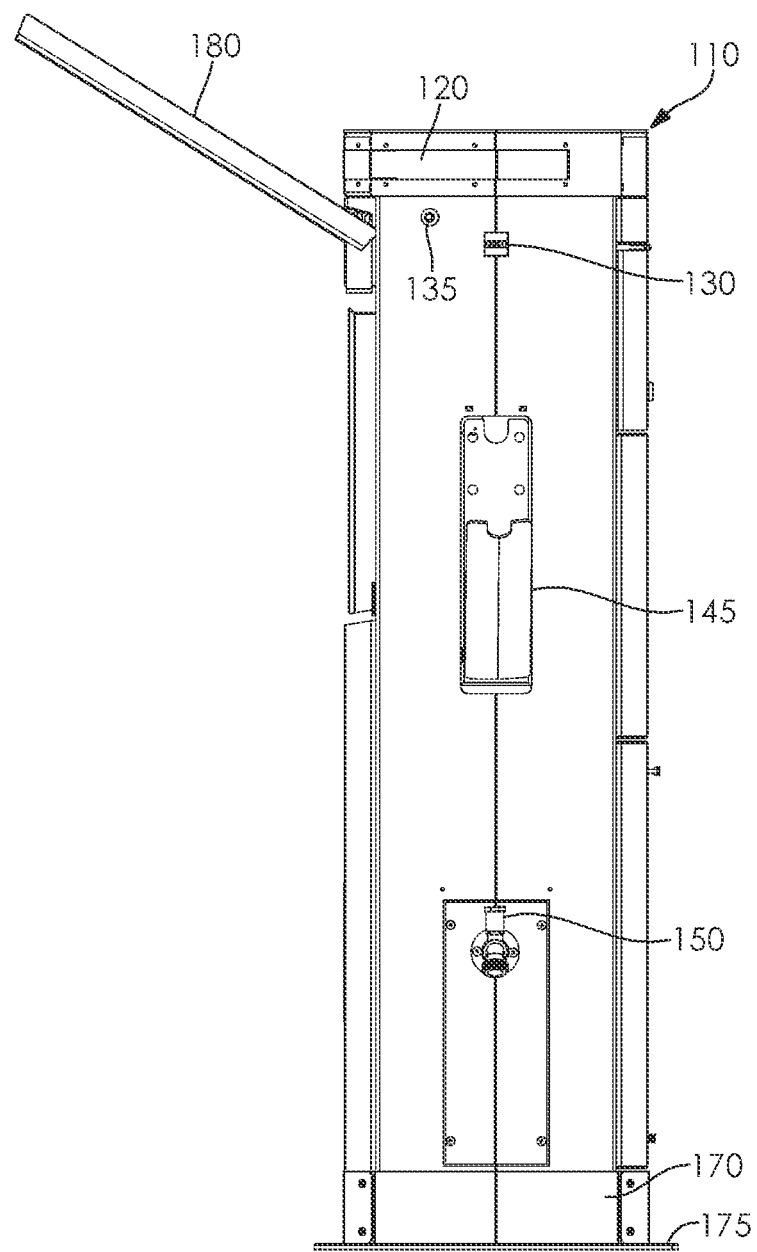
FIG. 9 is a right hand side view of the RV pedestal of FIG. 1 with panels open consistent with an embodiment of the present disclosure.

Referring now to FIG. 8, the pedestal 110 may provide power to RVs. Embodiments may include access to a 20 amp power receptacle 225, a 30 amp power receptacle 215, and/or a 50 amp power receptacle 230 and breakers so that various RVs and other vehicles or appliances can connect to power. RVs have different power requirements based upon the equipment resident in the vehicle; for example, a washer/dryer, a television, and a refrigerator. As a result, some RVs have 30 amp power systems and some may have 50 amp power needs. The RV user will plug into one of those two receptacles depending on the power needs of the vehicle. In some embodiments, one power receptacle may be used to charge the RV, another power receptacle may power any of the RV's electric appliances and simultaneously, a third power receptacle may charge an electric tow vehicle. Fast charging of a vehicle may use for example the 50 amp power receptacle 230. As may be appreciated, the different power receptacles available can be a major convenience because different size vehicles usually have different load requirements. The pedestal 110 may include a circuit breaker panel including circuit breakers 220, 235 and 240. The circuit breakers 220, 235, and 240 control whether electricity is flowing to the power receptacles 215, 225, and 230.

Referring now to FIGS. 11 and 12, some embodiments of the pedestal 110 are configured for direct compatibility with electric vehicle charging ports. FIGS. 11 and 12 show a pedestal 300 according to another illustrative embodiment, that is similar to pedestal 110 except that pedestal 300 includes an electric charging wand 350 that is configured for plugging into an electric vehicle's charging receptacle (not shown). Elements in the pedestal 300 that are alike or the same as elements in the pedestal 110 are called out by the same reference numeral. Accordingly, no description of those same elements will be repeated. The charging wand may be for example, a level II charger may be used for the tow vehicle or for future electric battery powered RV units such as the Airstream® eStream™ battery powered trailer. The charging wand 350 may be connected to a high voltage cable 355 that is connected to the internal power source of the pedestal 300. For sake of illustration, the internal electrical connections to the pedestal's power source(s) are not shown. In some embodiments, the pedestal 300 may include a cable hanger 360 to hold the cable 355 when the charging wand 350 is docked in the pedestal 300. The charging amperage rating for the charging wand 350 may be approximately 50 amps. The level of charging rate (kilowatt-hour) may vary and may be controlled according to the park's administrator in some embodiments through an admin UI in the software application. The power flow for the charging wand may be controlled by the same circuit breaker system where the circuit breakers 220, 235, and 240 are located, however, the pedestal 300 may include a separate circuit breaker (not shown) specifically for the charging wand 350. As may be appreciated, by integrating the charging wand 350 into the pedestal 300, RV owners may quickly and simultaneously charge up their electric tow vehicle using a familiar plug-in method (and not having to carry their own charging cable or adapter) while consuming power in the connected RV for other appliances or power applications when connecting to the power receptacles 215, 225, and 230. In addition, it should be appreciated that the pedestal 300 converts an RV park from a mere parking site to a convenient fueling site/stop as well for those using electric vehicles. Without the pedestal 300, RV owners would usually have to locate a separate gas station before or after parking in the RV park. Similarly, those RV owners towing with electric vehicles have to locate a charging station, which at present, may be far and few between RV sites that are typically in less populated areas, before parking at the RV site. As will be described in further detail below, the charging function for the electric vehicle may be monitored and/or controlled via a mobile software application. The RV owner may be able control charging usage by predetermining the amount of power consumed, disconnect the charge while resting in the RV or elsewhere, and re-connect charging through the app as needed during extended stays.

Figure 6:
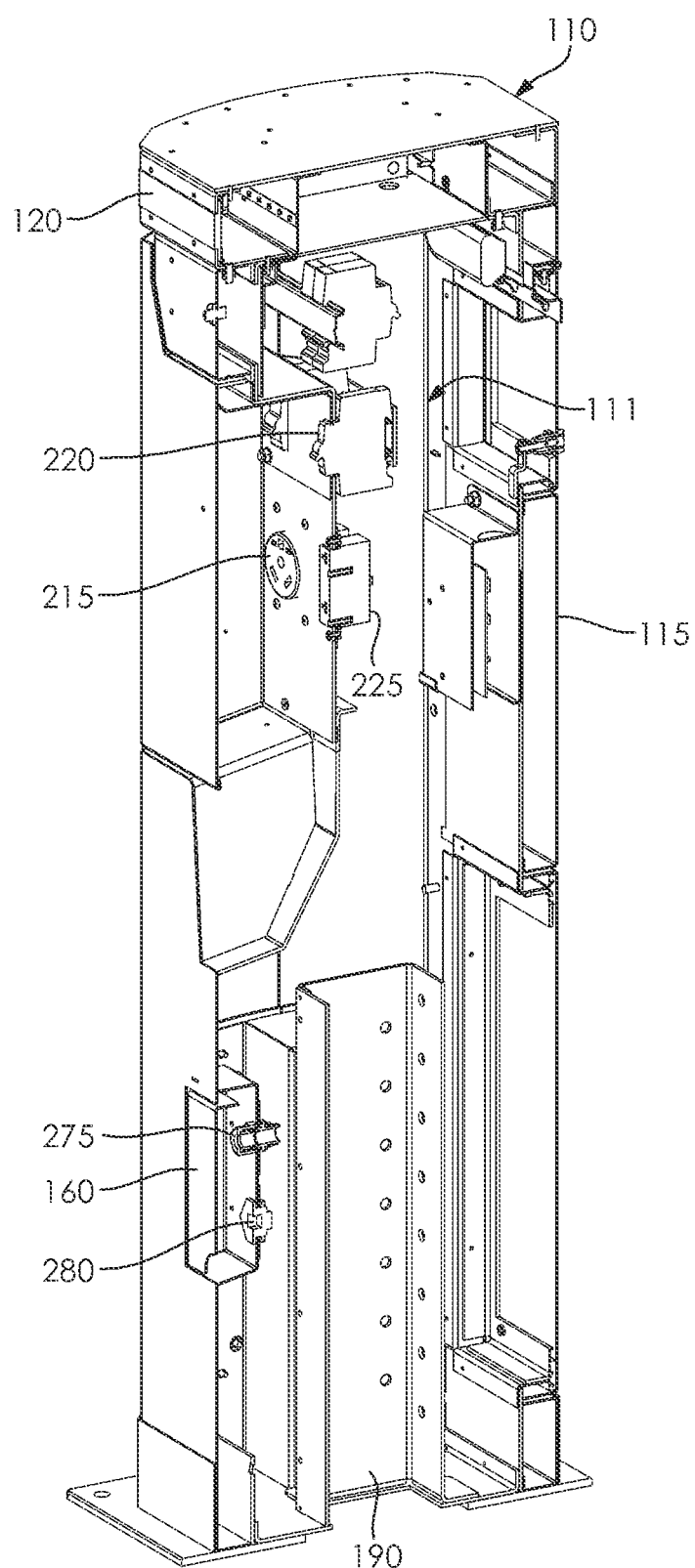
FIG. 6 is a cross-sectional view taken along the line 6-6 of FIG. 1 consistent with an embodiment of the present disclosure.
Figure 7:
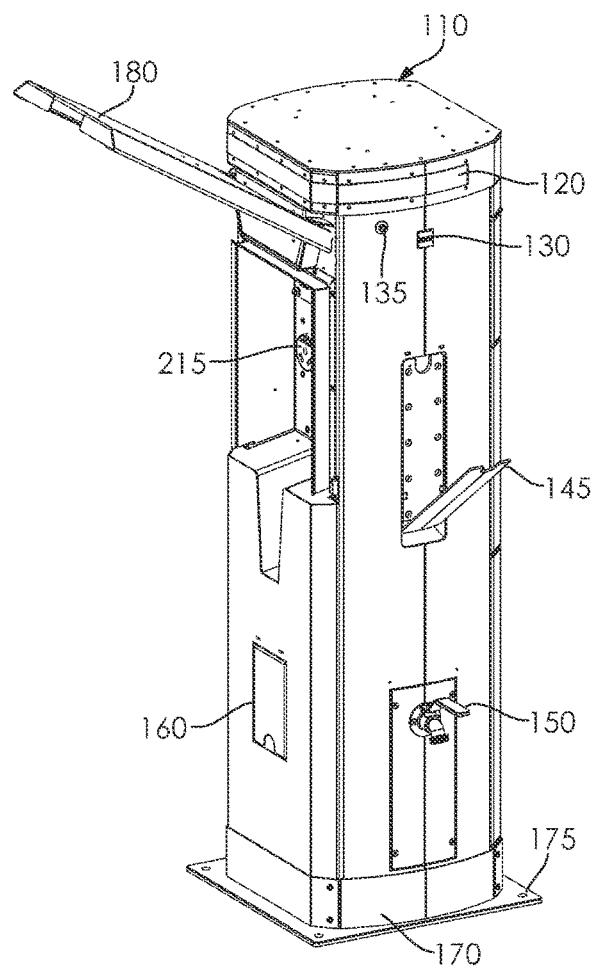
FIG. 7 is a right hand, top, perspective of the RV pedestal of FIG. 1 with panels open consistent with an embodiment of the present disclosure.
Figure 10:
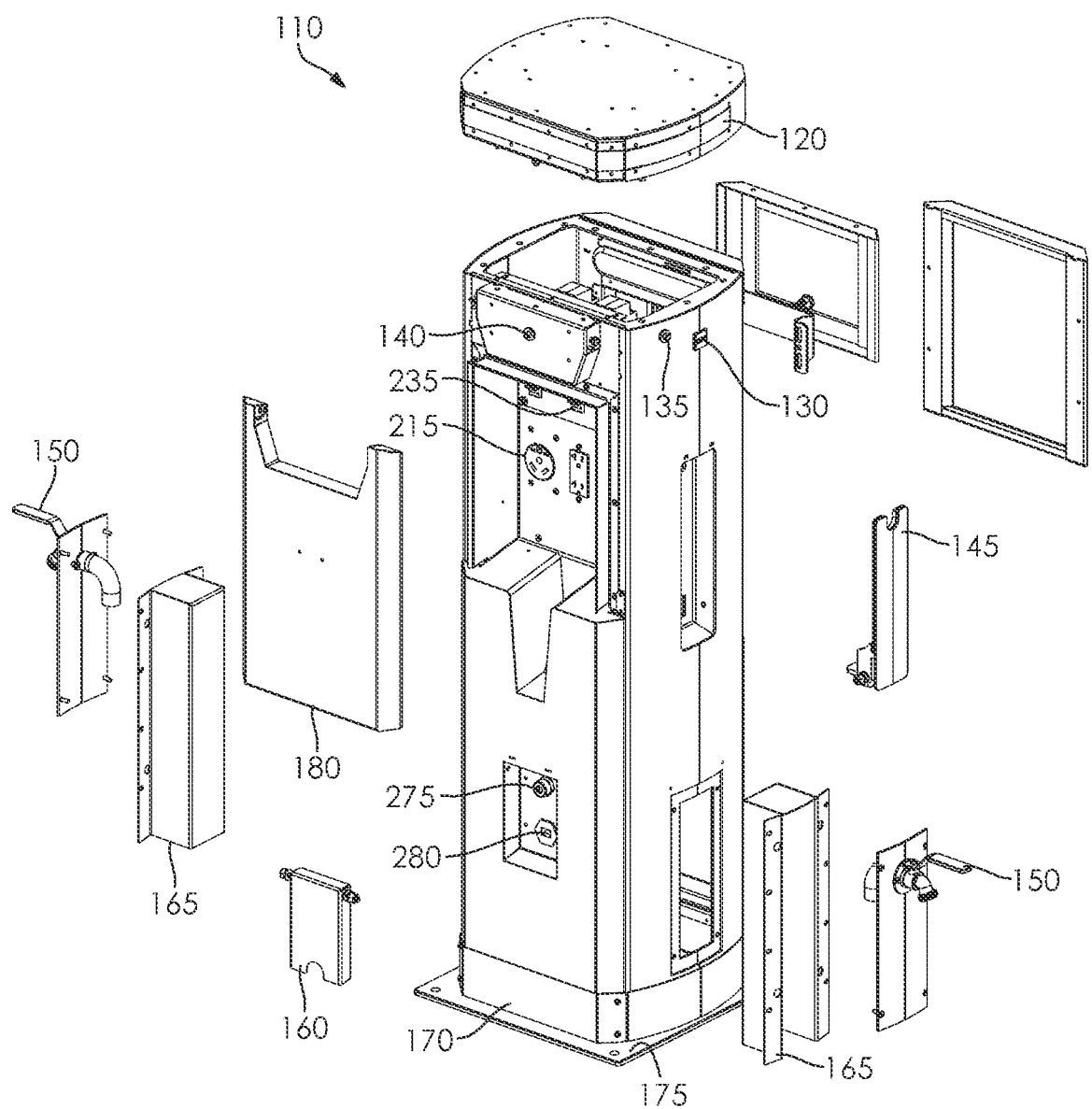
FIG. 10 is an exploded, right hand, top, perspective of the RV pedestal of FIG. 1 consistent with an embodiment of the present disclosure.
Figure 15:
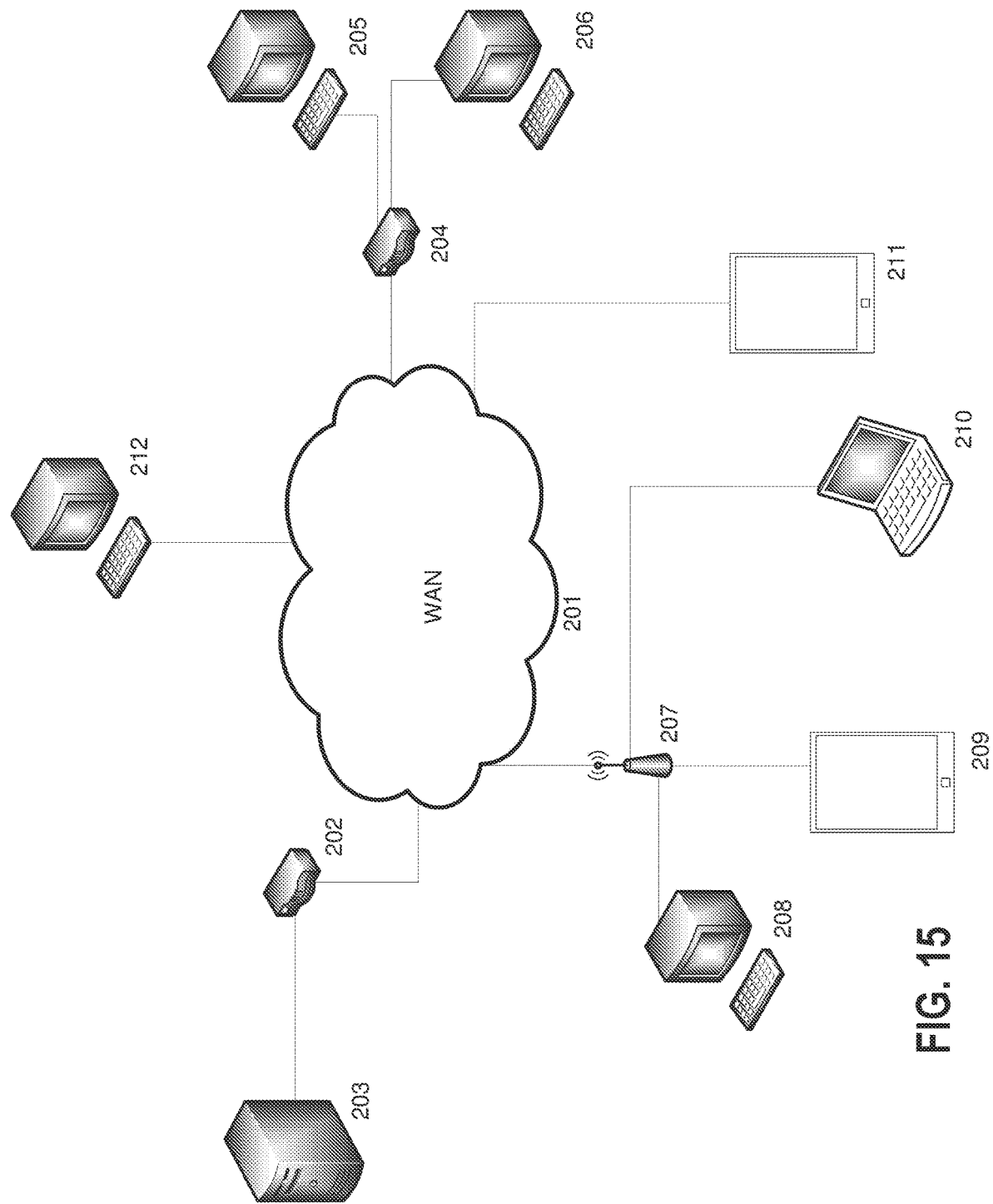
FIG. 15 is a schematic illustration of an exemplary network, in accordance with at least some embodiments of the present disclosure.

Referring now to FIGS. 6 and 10, some embodiments of pedestals 110 may include panels with a coaxial cable port 275 and/or an Internet/Ethernet port 280 so that vehicles may access telecommunications networks. The coaxial cable port 275 and the Internet port 280 allow users to hard wire connect into the Internet or other telecommunications network. Signals from the coaxial cable port 275 and the Internet port 280 are routed to the Ethernet controller 260 and Wi-Fi/Transceiver 270 for connection to external entities (including for example, an end user's mobile computing device). As maybe appreciated, the Internet connectivity allows the pedestals 110 to become network connection points. Accordingly, some embodiments of the subject disclosure create a mesh network using the individual pedestals 110 as access points. RV park users may use the mesh network created amongst pedestals 100 instead of routers to connect to the Internet or to create local area networks. The number of access points may be governed by the physical distance between pedestals 110. FIG. 15 shows an embodiment of a network and is discussed in further detail below.

Computing and Network Aspects

Figure 14:
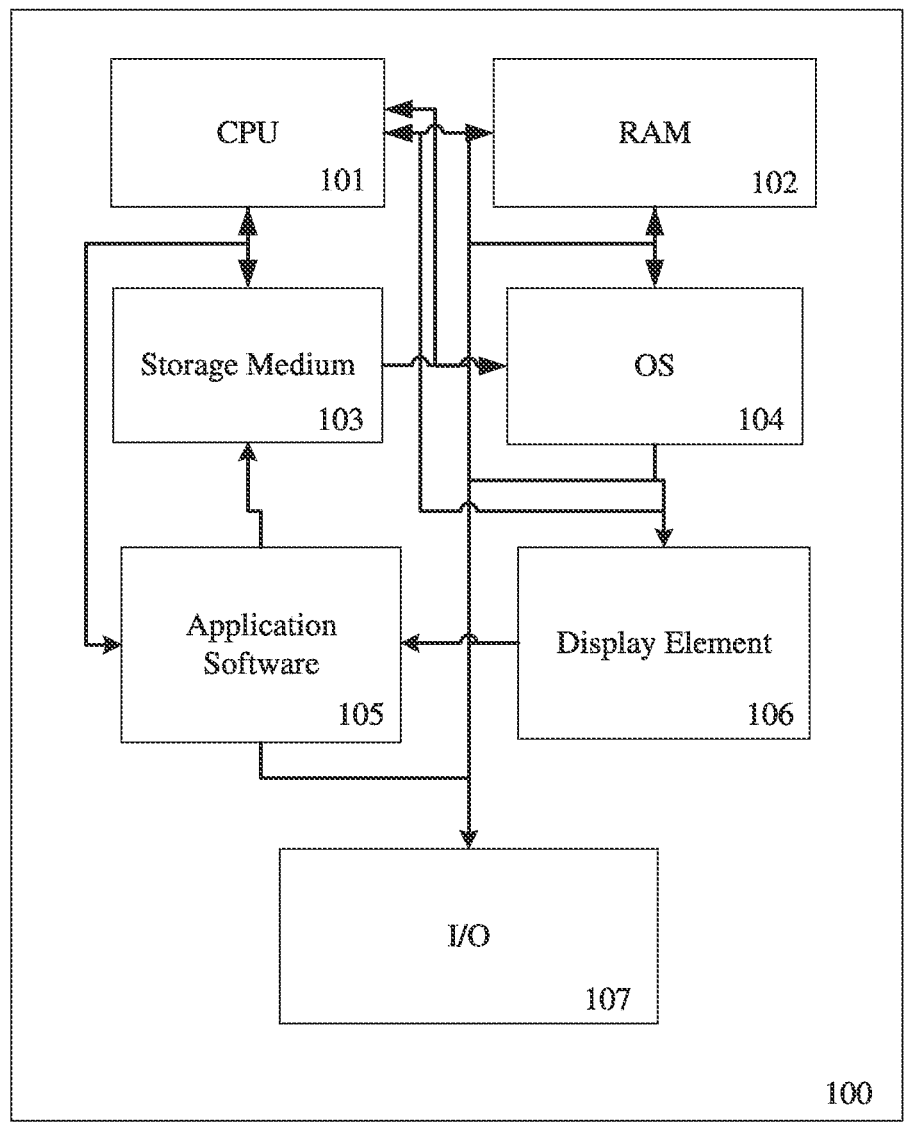
FIG. 14 is a schematic illustration of an illustrative computing device, in accordance with at least some embodiments of the present disclosure.

An illustrative representation of a computing device 100 appropriate for use with embodiments of the system of the present disclosure is shown in FIG. 14. The computing device 100 may be representative of a machine that may be an end user device (for example, but not limited to, a smart phone, a smart wearable device, a desktop PC, a computing tablet, a laptop computer, a digital interface integrated into the RV or pulling vehicle, etc.) or an online hosting service device (for example, a computer server) as described above. In some embodiments, the pedestals 100 and 300 may include a computing device 100 instead of or in addition to, the controller module 185. In some embodiments, a computing device 100 may be installed in modular versions of the pedestal bay 125 that may be used to retrofit pre-existing pedestals. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wi-Fi, Bluetooth, USB). Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 13, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Referring to FIG. 15, a schematic overview of a system in accordance with an embodiment of the present disclosure is shown. The system is comprised of one or more application servers 203 for electronically storing information used by the system. The server 203 may represent the centralized or cloud baser server referred to above with respect to FIGS. 1-13. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet). The applications in server 203 may be configured to provide the service features associated with RV use of pedestals 100 described above.

According to an exemplary embodiment, as shown in FIG. 15, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G, 5G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to. The computing devices 205, 206, 208, 209, and 210 may represent for example, an end user device or a hosting device(s). One or more of the computing devices 205, 206, 208, 209, and 210 may represent the controller module 185 in one or more pedestals 110 in some embodiments. It will be understood that while the computing devices 205, 206, 208, 209, and 210 are illustrated as personal computers, servers, laptop, tablet, and smartphone type devices, these are for illustration only and the permutations of different computing devices shown can include the controller modules 185 in the pedestals 110. In some embodiments, the wireless access point 207 may be a Wi-Fi or Internet enabled module in a RV pedestal 110 of the subject disclosure.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 16:
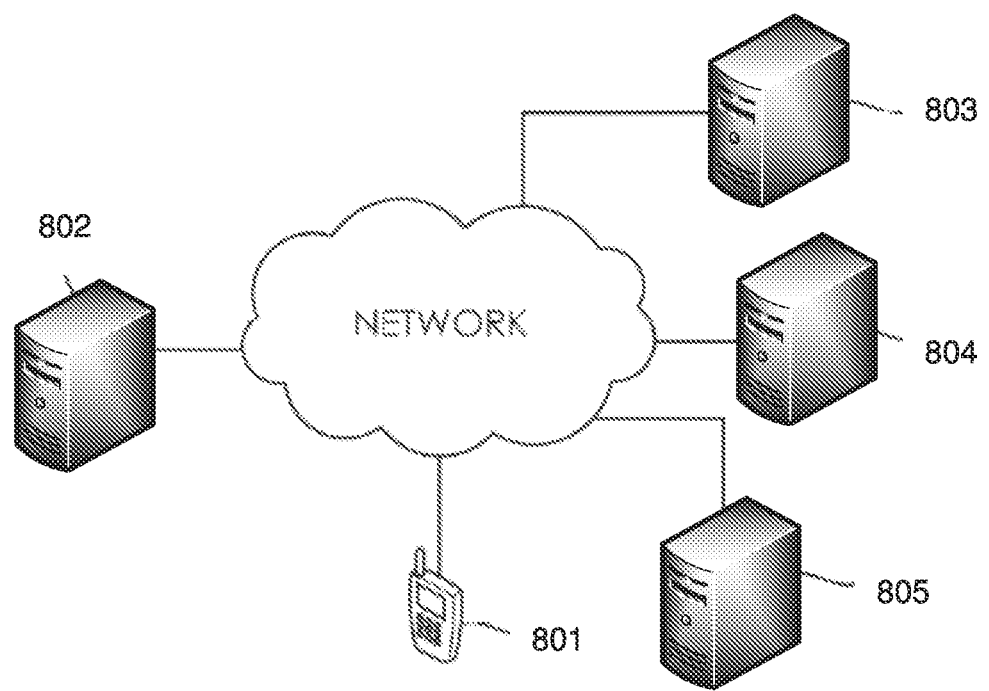
FIG. 16 is a schematic illustration of an exemplary network, in accordance with at least some embodiments of the present disclosure.

Turning now to FIG. 16, a continued schematic overview of a cloud-based system in accordance with an embodiment is shown. In FIG. 16, the cloud-based system is shown as it may interact with users and other third party networks or APIs. For instance, a user of a mobile device 801 may be able to connect to application server 802. Application server 802 may be able to enhance or otherwise provide additional services to the user by requesting and receiving information from one or more of an external content provider API/website or other third party system 803, a constituent data service 804, one or more additional data services 805 or any combination thereof. Additionally, application server 802 may be able to enhance or otherwise provide additional services to an external content provider API/website or other third party system 803, a constituent data service 804, one or more additional data services 805 by providing information to those entities that is stored on a database that is connected to the application server 802. One of ordinary skill in the art would appreciate how accessing one or more third-party systems could augment the ability of the system described herein, and embodiments of the present invention are contemplated for use with any third-party system.

The services referred to above may include for example, RV site reservations, account payments, pedestal usage tracking, map generation, route generation, and any other feature described herein when using for example, a mobile or PC based application. Examples of services provided through mobile application (or PC) embodiments are described for illustrative purposes in the following.

Mobile Software Application

In an embodiment, the smartphone application (sometimes referred to as the "mobile application" or in short as the "app"), may include a registration process that captures:
1. RV type including dimensions, whether the setup includes two vehicles (for example, a hitched trailer), etc.
2. Power requirements
3. Preferred site type (full hookup, water & electric only, pull-through, etc.)
4. Owner preferences (preferred activities, restaurant categories, sports, etc.)
5. Credit card information for reservation charges.

In some embodiments, the mobile application communicates with a pedestal's controller module 185. The app may provide a user interface through which the end user controls different functions of the pedestal 110 when an RV is connected to the pedestal. For example, the end user may control (set limits on) how much power is consumed when plugged into one of the power receptacles. The user may control which how much usage of Internet connection/bandwidth will be used when connected. For charging applications, the end user may set a rate of charge and control when to end charging through the app. The user may control the illumination of the light 120, which may include an intensity level of the light.

Some embodiments include a system to remotely control the units. For example, an administrator or central computing device for the park may read the electrical/water usage of each pedestal 110 remotely. Lighting for each pedestal 110 may be controlled remotely through rules set up in the software. For example, in the shoulder seasons in the north, the park manager may wish to have only a few of the sites illuminated at night for security purposes and have other sites that are being rented have full lighting. The system may automate turning on the lights 120 at dusk and turning the lights 120 off 30 minutes prior to sunrise, or some other user set time. In setting on/off times, some embodiments may use signals from the ambient light sensor 140 to determine whether the light 120 should be on or off or the intensity set somewhere intermediate off and fully on. If there is a water leak as utilities are commissioned in the spring, the water metering may trigger an alert indicating which pedestal 110 is the source of the leak without requiring a scheduled visual inspection of every RV lot.

Figure 17:
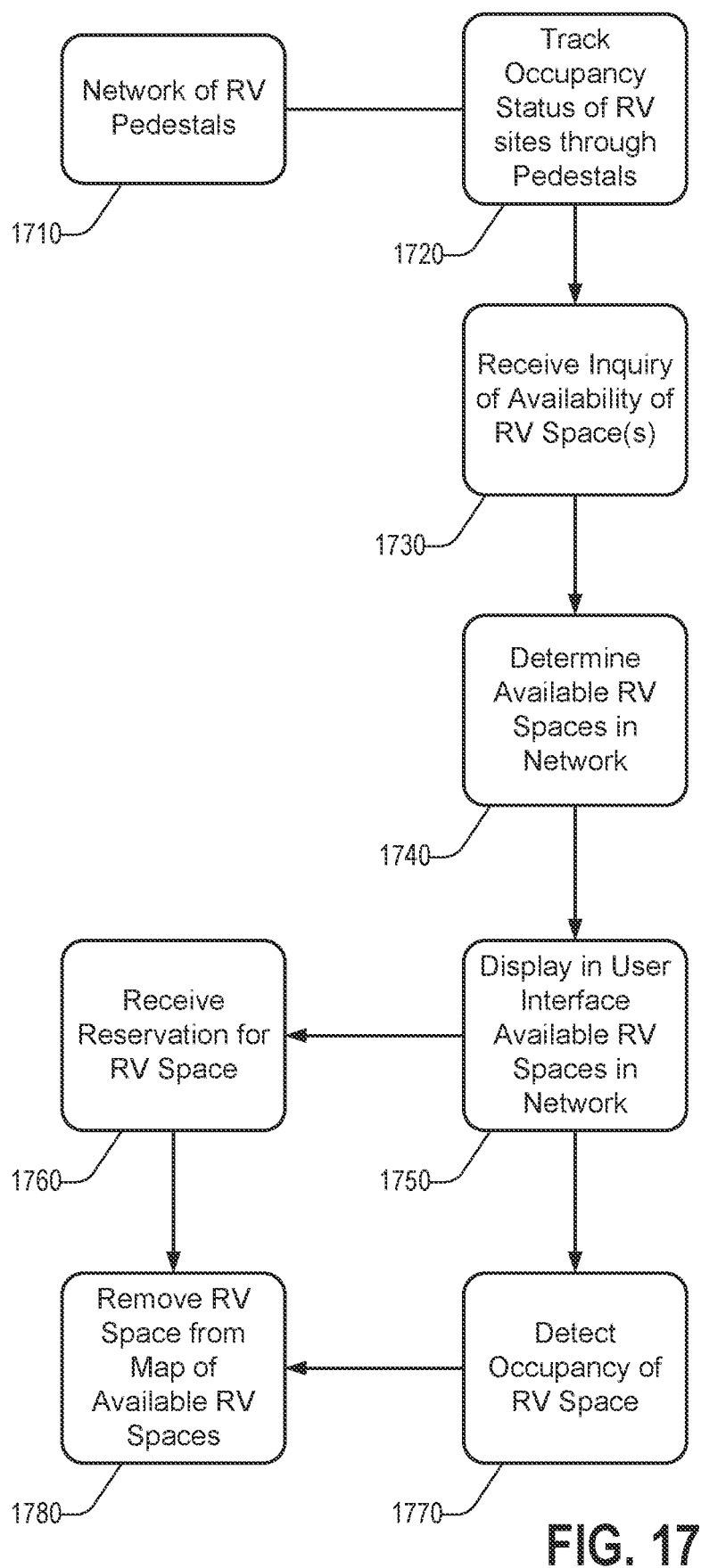
FIG. 17 is a flowchart of a method for coordinating RV space availability through a network in accordance with another embodiment of the present disclosure.

Some embodiments may include a mobile application that communicates with the network of RV pedestals. An RV park may place their inventory online through the app and the RV owner can check availability, complete a registration, and pay for the site rental through the platform. FIG. 17 shows a process for managing an online reservation system for RV spaces according to an illustrative embodiment. Availability may be determined by communicating with a network 1710 of RV pedestals. The system may track 1720 the occupancy status of individual RV spaces by detecting whether an RV is parked or hooked up to the pedestal for a space. In some embodiments, an RV owner registered through the platform service sends a message (inquiry) that is received 1730 by the RV park (or host platform) through for example, the mobile app. The park or system may respond after determining 1740 the availability of RV spaces. When an RV is detected 1770, the pedestal 110 may report to the centralized server or cloud based server that the space is occupied. Occupancy of an RV space may be shown in a map of pedestals 110. An unoccupied RV space may be detected by the system and its availability displayed 1750 through the app, ready for reservation. The system may receive 1760 a reservation request for an RV space. If a space becomes reserved or occupancy is detected, the RV space may be removed 1780 from availability in the map displayed to the end user.

Figure 18:
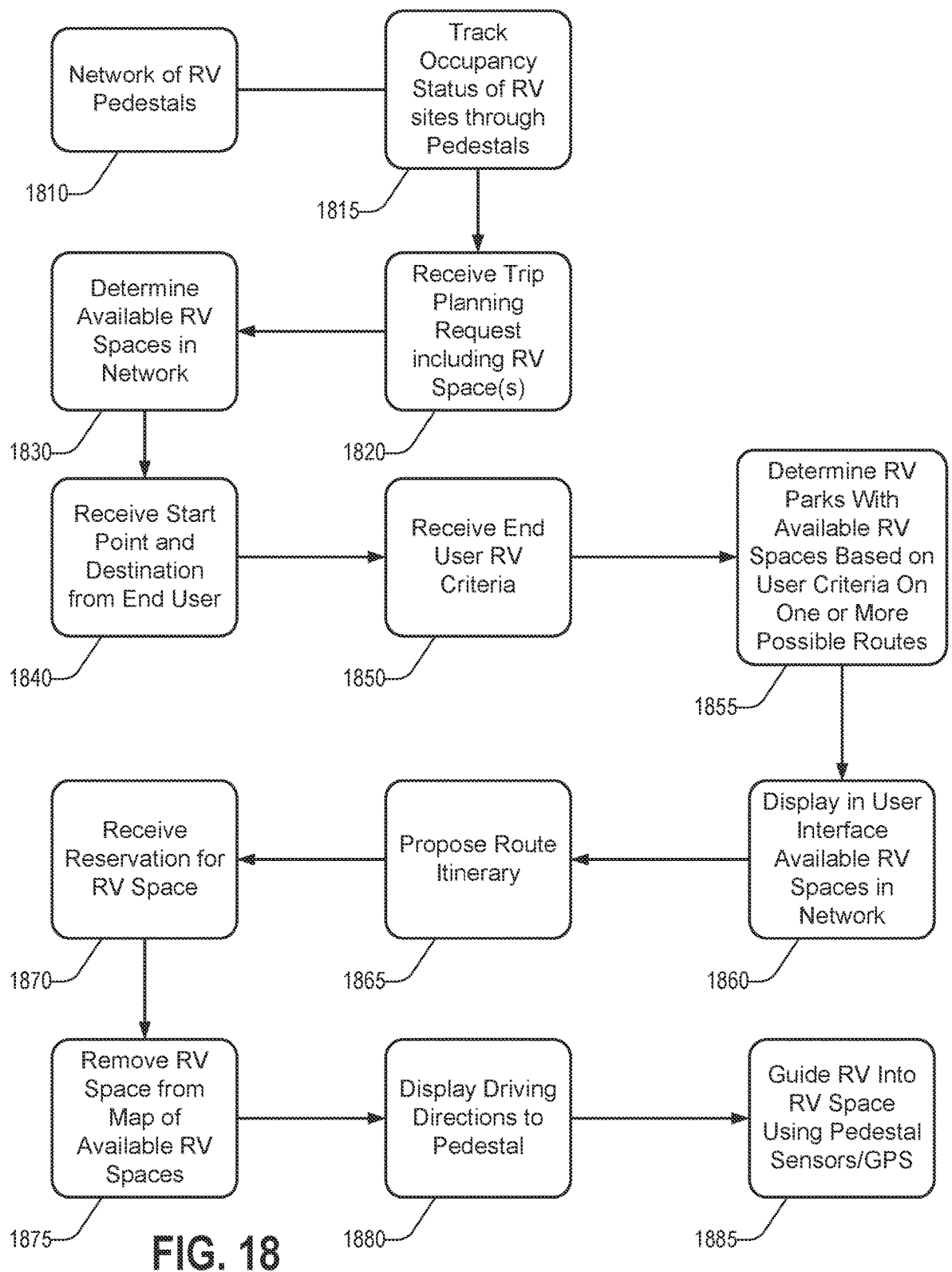
FIG. 18 is a flowchart of a method for generating an automated trip planning recommendation through a network for RV docking in accordance with another embodiment of the present disclosure.

Referring now to FIG. 18, a reservation system and trip planning process is shown according to another embodiment. Some embodiments of the reservation system and trip planning may prioritize parks associated with the RV pedestal network 1810 of the subject disclosure. Occupancy of RV spaces in the network 1810 may be continuously tracked 1815. The RV owner send 1820 a trip planning request to the system. The system may determine 1830 currently available (or in some embodiments, projected available) RV spaces in the network. The end user may send 1840 a starting location and a destination through the mobile application. The owner may provide 1850 criteria for an RV space, for example, specifying the number of miles they wish to cover on average in a given day and/or data related to their RV. The system checks 1855 for availability in RV parks that are part of the system by matching distance and available sites in individual parks with the RV dimensions, power requirements, preferred lot type, and preferred historical saved sites that the owner may have entered when completing the initial registration in the mobile app or subsequent visits to individual parks. Available RV spaces may be displayed 1860. The system may present 1865 a proposed itinerary with the closest matches to the data entered by the end user. The end user may select 1870 all or part of the itinerary, or reject the proposal. If the end user accepts all or part of the trip plan, the system completes the booking process and provides the owner with a confirmation of each park the end user will stay in along the itinerary destination. RV spaces on the proposed itinerary may be removed 1875 from availability upon check-in to each space by the end user. In some embodiments, driving directions to each pedestal may be displayed 1880. In some embodiments, the end user may be guided 1885 through the app, into individual RV spaces. Details of guided parking are provided by example below.

In some embodiments, the pedestal 110 and the controller module 185 may be configured to provide self-docking technology using the proximity sensors 135 and network connectivity. In one embodiment, the system uses software on, for example, the smartphone mobile application to provide the GPS position of the front of the vehicle. Values marking the dimensions of the RV site are stored in a table within the cloud-based or centralized server. Proximity sensor 135 data from the pedestal 110 associated with the RV space being parked into may be used to gauge the position of the vehicle being parked. In some embodiments, data from proximity sensors 135 of nearby pedestals 110 may also be used to gauge position. In one instance the display on the smartphone is used to show the position of the vehicle relative to the proximity sensors 135. The software guides the driver to make appropriate movements to center the vehicle in the RV site.

In another embodiment, the technology may be built into the GPS system of the RV so that the GPS position is provided by either the smartphone or a computing device on the RV itself. A software embodiment provides in the GPS display of the RV or tow vehicle display, directions and instructions for the driver to center the vehicle in the space using the detected position of the vehicle provided by the pedestal 110.

In another embodiment, a software embodiment may integrate with a self-parking hardware module in the vehicle that controls speed, direction, forward or reverse movement, lateral steering, and braking. The system is designed to be self-contained or to pass instructions through an API to proprietary technology developed by the vehicle/RV manufacturer. In one embodiment, the driver approaches the RV site and aligns the vehicle at the entrance to the site. The driver is alerted that the vehicle is in position for self-docking through an alert on the GPS display. The driver engages the internal hardware commencing the self-docking sequence on the GPS display and the control of the vehicle is passed to the self-docking system. The self-docking system communicates with the pedestal 110 to monitor position during the parking process. Vehicle control is maintained in a shared environment so the driver can override the system in a situation where there is imminent danger (for example, an animal running behind the vehicle).

During setup of a park map, the coordinates (for example, 4 corners) of each RV lot will be mapped and recorded in a data base. The cloud-based software utilizes a smartphone or RV internal device and the known dimensions of the vehicle to position it relative to a virtual map of the site. The smartphone or internally installed software (within the vehicle GPS system) monitors the vehicle position relative to the GPS coordinates of the site and provides instructions to the driver or to self-docking technology to direct the vehicle to the optimum position within the virtual map of the site.

Some embodiments may include an assist button (not shown) on the pedestal 110. The assist button trigger a notification message to the office of the RV park (or to the centralized or cloud based server) that assistance is needed at a specific RV site; for example, where the end user is located. For example, the button may be on the side of the pedestal unit just below the light box 120. In some embodiments, the alert may be sent to an administrative mobile app that might be used by RV park security. In some embodiments, the light 120 may be configured to illuminate with a color or pattern that indicates the need for assistance.

In some embodiments, a QR code may be attached to each pedestal 110 and may be used to associate each specific unit with a smartphone mobile app. By using the app and QR code, users may provide images and reviews of specific RV lots/sites to share with other users, research local restaurant options, discover local attractions, and potentially settle account charges. In some embodiments, the mobile app may alert owners if power is interrupted to their RV when the RV is connected to the power feature(s) of the pedestal. The QR code may sometimes be used to check in to a pedestal 110. While a QR code is disclosed, other embodiments may use a different code type without departing from the scope of the subject disclosure.

Hardware integration with RV site reservation system. Some embodiments may include an online host platform for the pedestal network. Users may reserve RV parking spots and pedestal hook-ups through the online platform. The platform may record pedestal reservations and usage which may be associated with a user's account. Users may reserve their favorite sites based on accessing a history of scanned locations (for example, by registering the use of a pedestal via the QR code).

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, machine learning, artificial intelligence computations, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

In at least some exemplary embodiments, the exemplary disclosed system may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis and determinations identifying medical conditions. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:

1. A pedestal device for providing one or more connections to a recreational vehicle (RV), comprising:
   a frame;
   a control module coupled to the frame, the control module including a computer processor;
   a power source;
   one or more electrical outlets coupled to the power source;
   an electronic components bay that is modular and configured to reversibly attach to a top outer portion of the pedestal device, wherein the control module is coupled to the frame via the electronic components bay;
   a light received inside the electronic components bay, wherein the light is emitted through a lens encircling at least twenty-five percent of a perimeter of the electronic components bay; and
   a network connection coupled to the control module, wherein the network connection is configured for wired and/or wireless connectivity.

2. The pedestal device of claim 1, further comprising a coaxial cable port coupled to the control module.

3. The pedestal device of claim 1, further comprising an RJ45 cable port coupled to the control module.

4. The pedestal device of claim 1, further comprising a proximity sensor coupled to the control module, wherein the computer processor is configured to detect a distance of the RV to the proximity sensor and transmit an electronic message including the distance through the network connection.

5. The pedestal device of claim 1, further comprising a digital power meter coupled to the control module, wherein the digital power meter displays a power level representing power used.

6. The pedestal device of claim 1, further comprising a cord hanger coupled to the frame and configured to hold an electrical cord or water hose.

7. The pedestal device of claim 1, further comprising a light and an ambient light sensor coupled to the control module, wherein a light level provided by the light is controlled by the processor based on a signal from the ambient light sensor.

8. The pedestal device of claim 1, further comprising a rail post for receiving the frame, wherein a height of the frame is adjustable based on a connection to the rail post.

9. The pedestal device of claim 1, wherein the processor is configured to detect whether the RV is connected to the pedestal or parked in proximity to the pedestal.

10. The pedestal device of claim 1, wherein the processor is configured to meter a consumption of water and/or power provided by the pedestal to the RV.

11. The pedestal device of claim 1, further comprising a water spigot coupled to the frame and connected to a water source.

12. The pedestal device of claim 11, further comprising a baffle positioned intermediate the water spigot and one or more electronic elements positioned inside the frame.

13. The pedestal device of claim 1, further comprising:
   a first panel positioned in front of the one or more electrical outlets;
   a second panel positioned adjacent the first panel; and
   a channel in the second panel disposed to receive an electrical cord while the electrical cord is plugged into one of the one or more electrical outlets.

14. The pedestal device of claim 13, wherein the first panel includes a hinge on a top edge of the first panel, and is configured to flip upward from a base of the frame, exposing an access to the one or more electrical outlets.

15. A pedestal device for providing one or more connections to a recreational vehicle (RV), comprising:
   a frame;

a control module coupled to the frame, the control module including a computer processor;
a power source;
one or more electrical outlets coupled to the power source;
a first panel positioned in front of the one or more electrical outlets;
a second panel positioned adjacent the first panel;
a channel in the second panel disposed to receive an electrical cord while the electrical cord is plugged into one of the one or more electrical outlets; and
a network connection coupled to the control module, wherein the network connection is configured for wired and/or wireless connectivity.

* * * * *